United States Patent [19]

Black et al.

[11] Patent Number: 5,346,662
[45] Date of Patent: Sep. 13, 1994

[54] METHOD OF MANUFACTURING A COMPOSITE SEAL

[75] Inventors: David D. Black, Elgin, Ill.; John B. Wagner, Greenfield, Ind.

[73] Assignee: SKF USA Inc., Elgin, Ill.

[21] Appl. No.: 957,785

[22] Filed: Oct. 8, 1992

[51] Int. Cl.[5] .............................................. B29C 33/14
[52] U.S. Cl. .................... 264/138; 264/262; 264/277; 425/DIG. 47
[58] Field of Search ............... 264/138, 262, 266, 275, 264/277, 279.1, 257; 425/DIG. 47

[56] References Cited

U.S. PATENT DOCUMENTS

| | | | |
|---|---|---|---|
| 2,950,506 | 8/1960 | Corsi | 425/DIG. 47 |
| 3,162,456 | 12/1964 | Williams | 425/DIG. 47 |
| 3,193,884 | 7/1965 | Haynie et al. | 425/DIG. 47 |
| 4,125,247 | 11/1978 | Gabrys | 425/DIG. 47 |
| 4,653,980 | 3/1987 | Wentworth | 264/262 |
| 4,689,190 | 8/1987 | Peisker et al. | 264/277 |
| 4,969,653 | 11/1990 | Breen | 277/134 |
| 5,082,612 | 1/1992 | Butler | 264/138 |

Primary Examiner—Jay H. Woo
Assistant Examiner—Robert B. Davis
Attorney, Agent, or Firm—James T. FitzGibbon

[57] ABSTRACT

A method for forming a composite seal is disclosed. The seal includes a seal ring made from a lubricous fluorocarbon material affixed by a positioning collar to a seal casing having axial and radial flanges. The casing radial flange has an inner margin and a given outer diameter, and the seal ring has contact and non-contact faces. The seal ring also includes at least an outer margin of frustoconical configuration, terminating in an outer edge of a given diameter. The method includes positioning the seal ring and the casing in a multi-element mold, closing the mold and filling the mold cavity thus formed with a fluent, curable elastomer which is permitted to cure into a solid collar positioning the seal ring and affixing it to the casing. Thereafter, portions of the positioning collar are cut away to leave the seal ring secured to the casing by a positioning collar of substantially reduced, thin cross-section.

8 Claims, 4 Drawing Sheets

METHOD OF MANUFACTURING A COMPOSITE SEAL

The present invention relates generally to fluid seals, and more particularly, to specialized composite seals wherein the primary sealing ring is made from resinous fluorocarbon materials.

For many years, the advantages of resinous fluorocarbon materials, such as polymers of tetrafluoroethylene ("TFE"), have been recognized as advantageous. However, in spite of their naturally lubricous qualities and potential for long wear in sealing applications, commercial introduction of seals using such fluorocarbon materials has been comparatively slow. The principal reason for this is that, while the materials have some characteristics which are very desirable, including their lubricous character and the long wear life potential just referred to, as well as other advantages, such as chemical inertness, the materials have also possessed some drawbacks which inhibited the rapid adoption and use of these materials.

These drawbacks include the generally plastomeric rather than elastomeric character of such materials, and the difficulty in bonding or otherwise affixing them to other fluid seal materials such as rubber or metal. In this connection, the relatively inert chemical character of the product while an advantage from one standpoint, is a drawback from another standpoint, in that the chemical reactions necessary to create strong bonds are often difficult to achieve.

Over the years, attempts have been made to modify the properties of the fluorocarbon materials, or to impart the desired properties to composite products which include the fluorocarbon materials. Regarding physical properties, for example, TFE materials tend to have a substantial compression set, and in this respect, act oppositely from elastomers. This drawback is sometimes overcome by the use of mechanical backing materials, such as springs or the like, in order to apply and maintain a radial compressive load, for example.

In addition, the structural properties of many fluorocarbon materials have been altered by the addition of fillers such as carbon black, glass fibers, and the like, to improve their flexibility and to impart some resilience to them. Regarding the difficulties with bonding to other materials, some of these problems have been overcome by the application of technology that has been developed comparatively recently, including surface etching with hydrofluoric acid, irradiation treatments or the like.

Consequently, some difficulties in using fluorocarbon materials as the surface sealing element of fluid seals have gradually been overcome. However, as is the case with other materials that are difficult to work with, there is still room for considerable improvement in the manufacture of composite seals incorporating these materials. By "composite" as used herein is meant a seal having both a resinous fluorocarbon sheet material component and an elastomer component.

Referring now to another aspect of modern seal manufacture, it has often been desired to impart a hydrodynamic action to seals to supplement their static sealing capability. In this area, it has been known to emboss the surface of fluorocarbon resin sheets or rings so as to impress upon them a helical surface pattern that is effective to return oil or like fluid to the interior of a sealed region when there is relative rotation between a sealed surface of a machine part and a contact surface of the seal ring. In some instances, such formations may be cut, embossed (or debossed) in the process of seal manufacture. In other cases, such contours are impressed on the surface of the seal ring in a pre-forming or post-forming operation.

Another problem with manufacturing composite seals relates to the actual formation of the seal ring that is intended to provide the sealing action. In the past, it was customary to form flat seal rings by cutting cylindrical billets of resinous material perpendicular to their long axis and post-forming the flat rings by insertion of a mandrel through the inner diameter, thus "bellmouthing" the seal ring into a shape whereby an inner margin extends substantially horizontally for contact with a shaft or the like, and the outer margin extends generally radially for connection to a seal casing. This latter operation is usually achieved by rubber bonding, mechanical clinching, or similar operation.

Comparatively recently, a novel form of composite seal was developed which took additional advantage of the properties of fluorocarbon resin materials and which served to reduce some of the drawbacks associated with prior methods of forming the seal rings. One such product and method are described in U.S. Pat. No. 4,689,190, issued Aug. 25, 1987; the parent of that application became U.S. Pat. No. 4,501,431.

Both of these patents describe and claim a seal construction wherein the composite seal includes a ring which is initially made from a billet of a fluorocarbon resin by an angular cutting method that creates seal rings that are frustoconical in their as-formed condition. The combination of such rings with a bonding collar extending between an inner margin of the radial casing flange and a surface band on the reverse or non-contact surface of the resin ring created a seal wherein both inner and outer margins of the contact face can be used to provide a sealing action.

In this connection, the above-referenced methods enable manufacturers to obtain seals that will provide not only a primary or fluid-retaining action but also a secondary or excluder function whereby dust, dirt and grit are excluded from the sealed region. The seal described in the above-referenced patents is very advantageous in this respect. In such a seal, the radially inner margin forms a radially acting seal with a rotary shaft or the like, and the radially outer margin of the seal ring cooperates with the radial flange of an associated wear sleeve or the end face of a spacer, retainer, or bearing part to create an end face seal. As is known in the seal art, such a construction is advantageous in that the end face seal is very tolerant of radial runout while the primary or radial seal is very tolerant of axial runout and/or misalignment. Consequently, a seal incorporating both of these sealing actions is very desirable; the frustoconical arrangement of a TFE or like material enables a thin resin ring to serve both these functions satisfactorily.

Referring now to a particular problem of prior art composite seals, including those described in the above referenced '431 and '190 patents, such seals are manufactured by placing a precut frustoconical ring in one portion of the mold, closing the mold to position the seal ring and the seal casing in a slightly spaced apart relation, and then filling the mold cavity with elastomer and permitting it to cure. However, with this method, owing to the movement of the mold parts, it has not been possible to remove finished parts having a large excluder ring "overhang" or "undercut" from the mold without damage.

In other words, providing such an unsupported margin of sealing would require an undercut mold section that would make part removal difficult or impossible to produce at mass production levels.

As a practical matter, molds must open along a single axis, so whatever undercut areas are provided must be small; when these areas achieve significant size, there is a substantial risk of compromising quality on the one hand or simply accepting a greatly reduced production rate on the hand. When such parts are made, if the mold undercut portion unduly stresses the parts being removed, the components of the parts may tear or the parts may separate from each other, especially if the rubber securing them together is incompletely cured.

Even if the undercut is sufficiently slight that overhanging mold parts will not damage the finished product, it is still necessary to permit the elastomer to achieve a greater degree of cure than might otherwise be desirable in a production atmosphere. Hence, existing techniques have not made it possible or practical to make a seal with a large, unsupported outer margin on a fluoroelastomer ring.

Nevertheless, there is significant need for a seal having a ring with a more flexible outer, preferable larger margin forming its end face than has heretofore been available. The reason for this is that a seal with a large free margin would not only provide a larger contact area, but particularly if made to certain flexural standards, it would permit a much wider range of installed tolerances. In other words, the ability of the excluder seal to function effectively would not be compromised by slight or minor inconsistencies in its installed dimensions.

By way of explanation, if the wear sleeve or other end face surfaces is too close or too far apart from the margin of the seal ring, either the wear aspect or the sealing effectiveness aspect will be compromised. A seal having a large, unsupported sealing margin can overcome these difficulties. It is able to be installed in a wider range of applications with greater reliability. By "unsupported" is meant a seal without a solid ring supporting the seal ring, i.e., extending between the seal ring surface and the casing flange surface. Of course, some support may be provided by a thin ring of rubber, and such a ring is often desirable.

The present invention overcomes the drawbacks of prior art seals having narrow or limited outer margins forming on their end face portions, and also achieves other advantages, including the ability to control the range of forces applied by the seal ring to the end face of the wear sleeve or a part of the sealed mechanism.

According to the invention, a frustoconical seal ring is provided that has an outer diameter substantially greater than the inner diameter of the casing radial flange, so as to provide a considerable radial overlap between these diameters. During manufacture, the entire volume between these diameters is filled with elastomer in a mold having a cavity-forming surface without undercuts. This creates a solid annular support ring for the seal ring.

After the seal is removed from the mold, a V-groove is formed, preferably by knife cutting, and a major portion of the solid elastomeric ring lying between the two elements is removed. This leaves not only a groove to permit the outer ring margin to flex, but permits an elastomeric support ring of any desired thickness and configuration to remain bonded to the non-contact side of the ring margin. Whatever degree of elastomeric "flex" or "backup" action is desired may be imparted to the outer margin of the ring, determined by the shape and extent of the residual rubber backing up the seal ring.

In one variation, the cuts may be made at angles so as to provide better control over the kind and degree of seal ring margin support. The invention also involves the method of making a seal of the foregoing kind.

In view of the need, therefore, for improved composite seals made in part from fluorocarbon resin materials, it is an object of the present invention to provide a seal having improved performance in use.

Another object of the present invention to provide a composite seal having frustoconical seal ring with inner and outer margins respectively adapted to provide radial and axial seals and to be characterized by a substantial overlap between the inner diameter of the casing flange and the outer diameter of the seal ring to provide a relatively large and flexible seal margin capable of undergoing controlled deflection.

A further object of the invention is to provide a method of manufacturing a seal which includes forming a solid annular support ring to secure a casing to the non-contact face of an at least partially frustoconical seal ring, and thereafter reducing the cross-section of the solid ring so as to provide a seal ring secured to the casing by a thin rubber collar, leaving a flexible outer margin on the sealing ring, which margin may have a support ring of elastomer bonded thereto.

A still further object of the invention is to provide a composite seal having a seal ring which is at least partially frustoconical in its as-formed condition, but which is capable of applying radial and end face loads with one or more associated machine parts and wherein the end face loading is controlled at least in part by a flexible support ring of an elastomeric material bonded directly to the non-contact face of the seal ring.

Yet another object of the invention is to provide a composite seal having a resinous fluorocarbon seal ring with an axial end face sealing margin of an extent almost equal to the width of the seal casing radial flange.

Another object of the invention is to provide a method of forming a composite seal wherein the radial casing flange is engaged by a holddown ring having a substantially cylindrical wall of the same diameter as the major diameter of the fluorocarbon seal ring, thus forming a seal with a solid annular support ring having a generally triangular cross-sectional configuration and adaptable to being grooved by a subsequent operation so as to leave the seal ring bonded to the casing only by a collar of thin cross-section.

A further object of the invention is to provide a seal forming method wherein the degree or extent to which an outer margin of the resinous fluorocarbon seal ring is supported may be varied by changing the depth and/or angle at which a groove is formed in a solid annular support ring serving to bond the ring to a flange forming a part of the seal ring.

The foregoing and other objects and advantages of the invention are achieved in practice by providing a composite oil seal having a rigid seal casing, a thin, at least partially frustoconical seal ring made from a resinous fluorocarbon material and having contact and non-contact faces, with the seal further including an elastomeric positioning collar extending from an inner portion of the casing radial flange to a center portion of the non-contact seal ring surface, with the inner diameter of the seal ring being substantially less than the inside diameter of the casing radial flange, the outer diameter of the seal ring being substantially larger than the inside diameter of the radial casing flange, and with the seal also having a post-formed groove or annular notch lying between the radial flange and the outer margin of the ring to provide a seal ring with a flexible outer margin adapted to engage and form an end face seal with an associated machine element.

The invention also achieves its object by providing a method of positioning the seal elements relative to each other, bonding the elements together in the mold and removing a portion of the bonding elastomer so as to provide the composite seal unit just described.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate the corresponding parts throughout.

DESCRIPTION OF THE PREFERRED EMBODIMENTS OF THE INVENTION

While the present inventive concept is capable of being embodied in different forms, including seals with and without so-called "rubber O.D.'s" and in both ordinary and unitized form, i.e., seals that include wear sleeves associated with them, a description of the invention will be made of several presently preferred forms of seal only.

Figure 1:
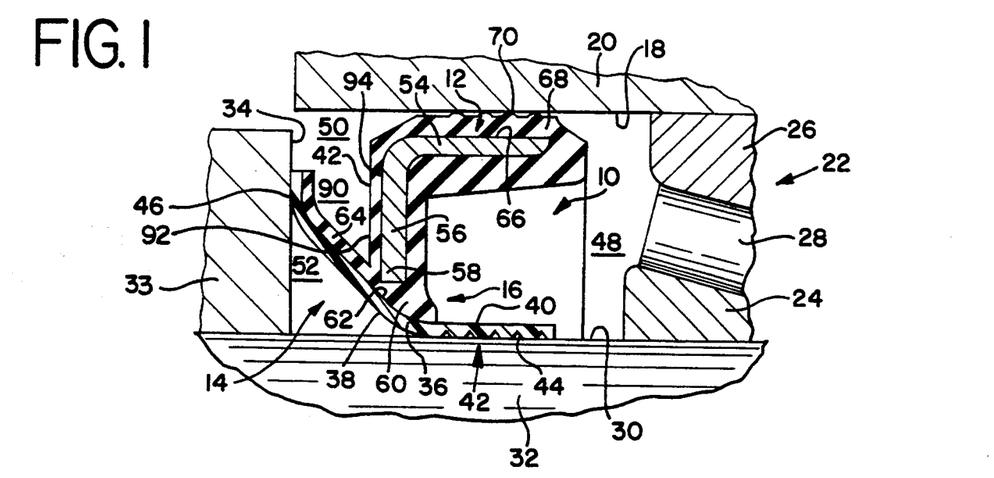
FIG. 1 is a fragmentary vertical sectional view showing one form of seal made according to the invention and installed in a position of use between two relatively moveable machine elements.

Referring now to the drawings in greater detail, FIG. 1 shows a novel seal generally designated 10 and shown to embody the principles of the present invention. This seal 10 includes three major components, namely, a stiff metal casing element generally designated 12, a primary seal element in the form of a fluorocarbon seal ring generally designated 14 and a bonding portion generally designated 16 and serving to bond a portion of the casing 12 to the ring 14.

In use, the form of seal shown in FIG. 1 is disposed within a working environment that includes a counterbore 18 in a stationery machine member 20, a bearing assembly generally designated 22 and shown to include inner and outer races 24, 26 positioning a bearing roller 28, with the bearing assembly 22 being positioned between the counterbore 18 and the outer surface 30 of a rotary shaft 33.

In the embodiment of FIG. 1, a spacer 33 is fitted over the shaft outside diameter surface 30, and this spacer includes a radially extending axially directed end face portion 34 against which an excluder seal will be formed, as will appear. The seal ring 14 includes a ring body 36 having a contact face or surface 38 and a non-contact face or surface 40. By "contact" is meant a surface that is intended to be used in a dynamic seal relation with an associated machine part. By "dynamic" as used herein is meant a seal between two relatively movable parts, as opposed to a "static" or gasket-type seal made between parts that do not move relative to each other.

In the illustrated embodiment, a dynamic primary seal area generally designated 42 is formed between a radially inwardly directed surface 44 of the seal ring 36 and the outer circumferential shaft surface 30. In addition, the contact surface 38 of the ring outer margin 46 engages the end face surface 34 of the spacer 32 in a dynamic sealing relation. Usually, this seal is described as an "excluder" seal.

In the form shown, which is conventional, common form of utilizing the inventive seal, the sealed region 48 lies in the area axially inwardly of the primary seal 42; this region 48 includes a lubricant that is intended to be confined to that area. The sealed region is sometimes also referred to as the "oil side" of the seal. A region 50 lies outside the sealed area, and this area may be characterized by dust, grit, water or like materials intended to be excluded not only from the seal cavity 48, but also the area near the primary seal. The area 52 is an interseal volume, i.e., a space between the primary and excluder seal areas 42, 46, which is desired to be kept free of contaminants which would compromise the integrity of the primary seal band.

Hence, as is known to those skilled in the art, an excluder seal functions primarily to keep materials that would attack the primary seal interface 42 from the seal band 44 or the surface 30 of the primary seal forming areas; the primary seal is intended only to retain the lubricant or other fluid within the sealed cavity.

Referring again to FIG. 1, it will be noted that the casing 12 includes an axially extending flange 54 which is intended to provide a structure for positioning or mounting the seal; a radial flange 56 extends inwardly from the axially outer end of the axial flange, and the radial flange 56 includes an innermost section 58 to which an annular web 60 of cured elastomer is affixed. By "axially inner" is meant lying toward the sealed region. In the form of seal shown, the innermost surface of the an elastomeric positioning collar 60 is bonded to a central portion 62 of the non-contact surface 40 of the ring 14.

In the preferred form of the invention, the outer margin 46 of the ring 14 has its non-contact surface 40 covered with a support ring 64 of elastomer, the significance of which is discussed elsewhere herein.

Referring again to FIG. 1, it will be noted that the outer surface 66 of the axial casing flange 54 is covered by an axially extending, cylindrical band 68 of elastomer. This band 68 includes an outer surface having plural ribs 70 thereon to facilitate snug but removable engagement with the surface of the counterbore 18. In one preferred form, the cylindrical band of elastomer 68 is joined to a radially inner section 72 that extends over and covers the inner surfaces of both the axial and radial casing flanges 54, 56.

Figure 2:
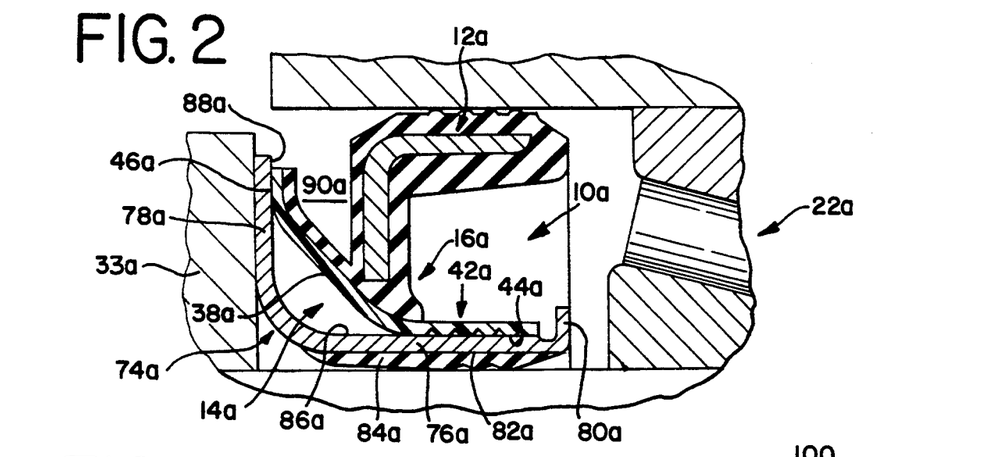
FIG. 2 is a fragmentary vertical sectional view similar to that of FIG. 1 but showing the seal of FIG. 1 combined with a wear sleeve to form a so-called unitized seal assembly.

Referring now to FIG. 2, an alternate form of seal generally designated 10a is shown. This unit includes all of the elements previously described, including the casing 12a, the seal ring 14a, the body of elastomer 16a and the bearing assembly 22a. The fluorocarbon ring body 36a has a contact face 38a. The only differences between the form of seal shown in FIG. 2 from that in FIG. 1 is that the seal 10a is used in conjunction with a wear sleeve element generally designated 74a. This unit 74a is shown to include an axial flange 76a, a radial flange 78a and a unitizing curl 80a. The radially inwardly directed surface 82a of the flange 76a is covered by a beaded cylinder 84a of elastomer; the radially outwardly facing axial surface 86a of the flange 76a faces and is contacted by the inwardly directed surface 44a of the seal ring 14a. This forms a primary dynamic seal area 42a. The radial flange 78a of the wear sleeve 74a includes an axially inwardly directed end face surface 88a which is engaged in use by the contact surface 46a.

While FIG. 2 also shows the use of a spacer 33a, it will be understood that such use is optional, because the provision of the form of wear sleeve 74a shown eliminates the need for the spacer 33a. In other words, the seal can be completely self-contained in that the wear sleeve provides engagement surfaces for both inner and outer contact faces of the seal, and hence no spacer is required. Of course, if the wear sleeve were only a cylinder, the end face could be formed by a spacer or other element.

Referring now to an important feature of the invention, it will be noted that, except for the support ring 64 of elastomer, the radially outer margin 46, 46a of the fluorocarbon seal ring 14, 14a is free to flex axially within wide limits. There is a substantial overlap between the inner margin 58 of the casing radial flange 56 and the outer margin 46 of the thin seal ring. There is consequently an open space or groove 90 (having a counterpart space 90a in FIG. 2) between the axially inner surface of the elastomeric support ring 64 and the end face 92 of the elastomer body covering the end face 94 of the casing radial flange.

As is known to those skilled in the art, while a very small groove has been provided in some prior art constructions, the volume of the space and the width of the seal ring free margin has been very small in relation to the width of the seal band generally, and the overall extent of the casing radial flange. This severely limits installation tolerances or latitude and also impairs the function of the seal.

The present invention provides a large volume in this area, and consequently provides a wide, highly flexible margin of resinous fluorocarbon seal ring material. Having an open space instead of a solid support ring permits maximum flexibility in use and maximum accommodation of "installed height" tolerances during assembly of the sealed parts. This is important for manufacturing reasons; it is also advantageous that the seal provide a wide latitude or tolerance of axial runout without compromise of sealing ability.

The advantages of such construction having been discussed, reference will now be made to a method of making such seals.

Figure 3:
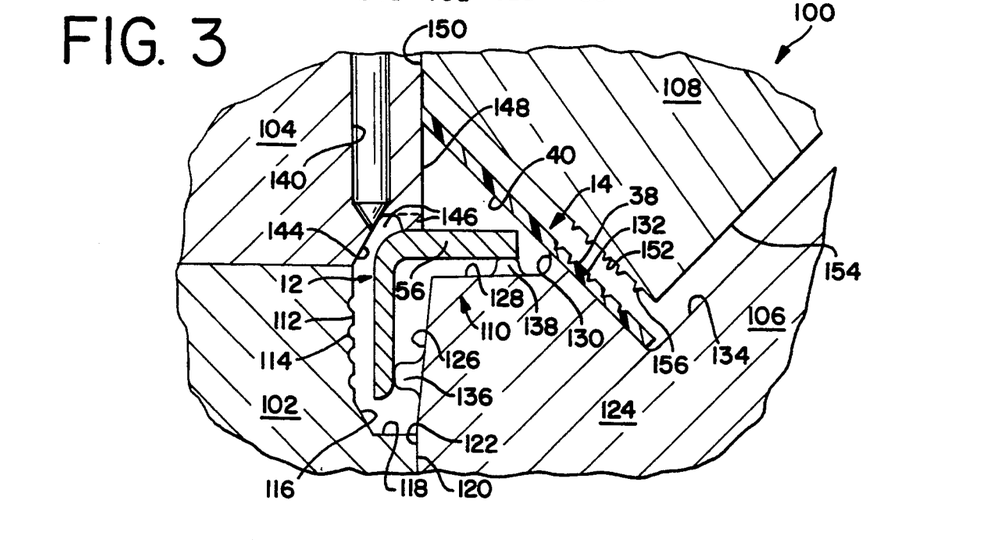
FIG. 3 is a vertical sectional view of one form of mold used to make seals of the invention and showing elements of the seal assembly disposed therein prior to completion of the molding operation.

Referring now to FIG. 3-7, a method of making the seal of the invention is illustrated. Referring in particular to FIG. 3, there is shown a mold assembly generally designated 100 and shown to include a lower ring 102, an upper or holddown ring 104, a lower insert 106, and an upper insert 108. Each of the mold parts or elements 102-108 includes one or more surfaces adapted to form a part of the molding cavity or to engage or support an element positioned in a multi-element mold cavity generally designated 110.

Referring to the lower ring, an axially extending circumferential surface 112 thereof includes plural circumferential, rib-forming grooves 114 therein; a tapered surface 116 lies in the lowermost portion of this circumferential surface. A radial face 118 extends inwardly toward and intersects with the upper portion of a surface 120 adapted to mate with an oppositely directed surface 122 on the lower insert 106. The various surfaces 112-118 are contoured so as to form, in the finished part, an outwardly directed "O.D." or outside diameter elastomeric mounting surface for seal.

The lower insert 106 includes a main body 124 having a radially outwardly directed, cavity-forming surface 126 which meets an axial end face cavity forming surface 128. The surface 128 terminates at its inner margin by meeting an axial stub surface 130 which in turn meets a frustoconical, inwardly extending seal ring seating surface 132. The innermost surface on the lower insert 106 is a frustoconical surface 134. The lower insert 106 also includes a pair of discontinuous lands 136, 138 positioned respectively on the surfaces 126, 128 and adapted to engage and support the casing 12 when it is positioned for molding within the cavity 110. The surfaces 126, 128, 130 form the radially inner portions of the seal unit, including one portion of what becomes the positioning collar 60 (FIG. 1) securing the ring 14 to the casing 12.

In the form of mold shown, the upper insert 104 includes a passage or sprue 140 through which fluent rubber may pass into the interior of the molding cavity 110. Another contoured mold surface 144 is provided to create a section of rubber overlying the bend in the stamping. A plurality of spaced apart holddown lands or bosses 146 are provided in a lower end face of the upper holddown ring 104. In addition, the circumferentially extending, radially inwardly directed surface 148 extends axially and serves to define the solid support ring-forming portion of the mold cavity 110 lying between the casing radial flange 56 and the non-contact surface 40 of the seal ring 14.

Referring now to the upper insert, in addition to a radially outwardly extending locating surface 150 adapted to position in sliding contact with the surface 148, the upper insert includes a taper or frustoconical facing holddown surface 152, terminating at its lower edge by intersection with the tapered surface 154. FIG. 3 shows a plurality of lands 156 of extending outwardly and downwardly from the mold surface 152. These surfaces are adapted to coin or emboss the contact face 38 of the seal ring with a hydrodynamic pattern.

In one preferred form, a single, continuous spiral formation is provided for this purpose. As is known to those skilled in the art, alternative constructions include the provision of plural, more steeply angled vanes or ribs; two- or three-lead helical threads may also be used.

It is preferred, but not strictly necessary, in accordance with the present invention, that grooves be provided on the finished seal ring 14; these are made by coining, so the lands 156 are provided on the upper insert surface 152 for this purpose.

In FIG. 3, the mold is shown to be in an intermediate position wherein the casing is held up in the cavity on the lands 136, 138 and is also pinched down by the upper land or mold corner 146. The seal ring 14 is positioned so as to be supported by the beveled surface 132 of the lower insert.

Figure 4:
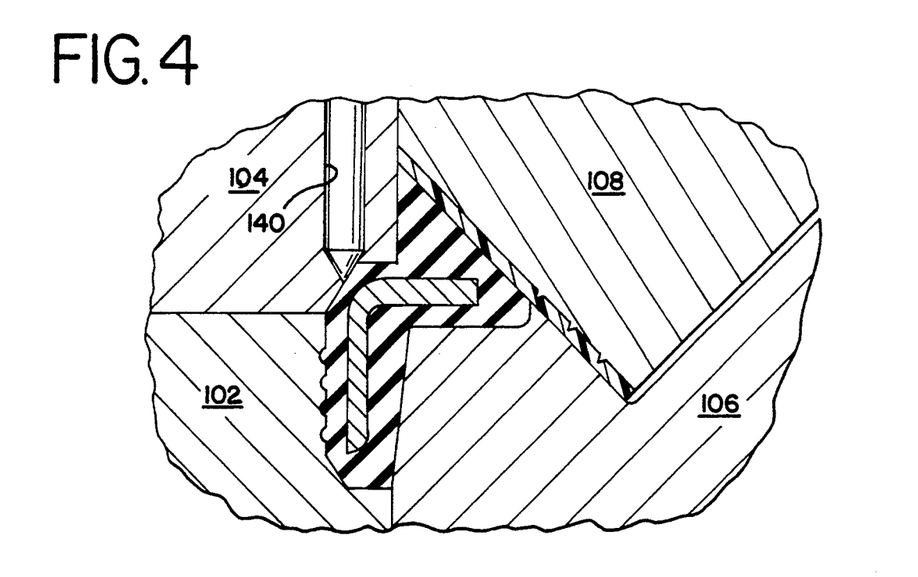
FIG. 4 is a view similar to that of FIG. 3 and showing the mold in a fully closed position and filled with elastomer.

FIG. 4 shows three of the steps in seal formation, i.e., completing downward movement of the upper insert 108, thereby clamping the seal ring 14 between the upper and lower inserts 108, 106 in fluid-tight relation, completing the coining or embossing operation, and filling the mold with fluent, curable elastomer.

When the mold is fully closed, a charge of fluent rubber is injected or transferred through the sprue 140 and into the molding cavity 110 which is completely filled with the fluent, curable elastomer, preferably a nitrile, modified nitrile or other synthetic elastomer is used. When the elastomer has finished curing, typically requiring 1.5 to 4 minutes at temperatures ranging from of 275°–400° F., the mold is ready to be opened.

Thereupon, the upper insert is raised and fully withdrawn, and the holddown or upper ring 104 is raised vertically, leaving a completed seal ready from removal from the mold cavity. No undercut, overhanging or other sections are present to prevent non-destructive removal of the completed seal 10 from the mold. The seal is then removed by knock-out pins or the like (not shown) and is taken from the mold by hand or otherwise in a manner known to those skilled in this art.

Figure 5:
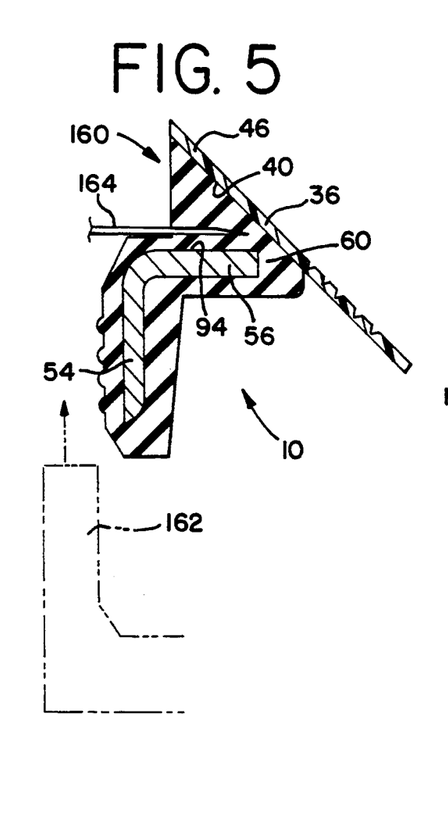
FIG. 5 is a fragmentary sectional view of the seal made in the mold of FIGS. 3 and 4, showing the seal same removed from the mold and showing an initial step in the cutting or trimming operation necessary to make the finished product.
Figure 6:
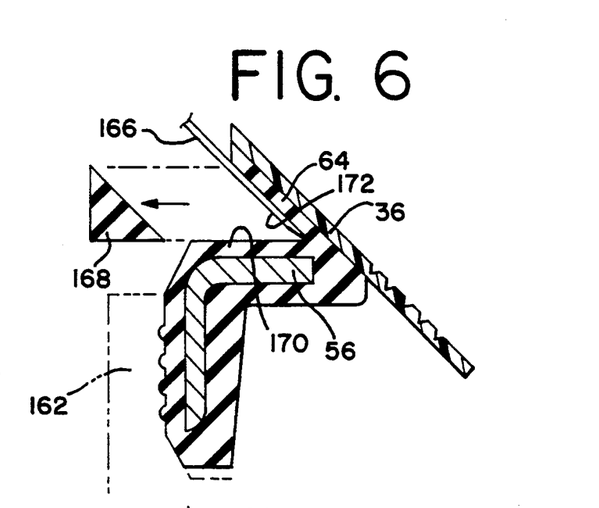
FIG. 6 is a view similar to that of FIG. 5 and showing how the trimming operation is completed and how a peripheral portion of the excess elastomer is removed to form the finished seal;.

Referring now to FIGS. 5 and 6, a subsequent seal-forming operation is depicted. Referring first to FIG. 5, the finished seal product generally designated 10 is shown to include all of the elements illustrated in FIG. 1, for example, except that there is a solid annular support ring generally designated 160 that extends from the outer margin 46 and the center section 62 of the non-contact surface 40 of the seal ring 14 to various surfaces of the radial casing flange 56.

While a seal such as that illustrated in FIG. 5 might have some limited functionality, it can easily be appreciated that little, if any, axial tolerance or movement range is permitted for the margin 46 of the ring 14. The solid annular support ring 160 is virtually incompressible, under light forces, and hence the ring margin 46 will not provide an effectively flexible end face seal in this area. Such a seal would be difficult to install, and once installed, its operating tolerances would be very limited.

Consequently, in making the seal of the invention, the solid annular support ring 160 is removed by positioning the seal casing or the like in a rotary tool or chuck shown as 162 in phantom lines. This chuck 162 is able to be spun about its center line axis (not shown) lying parallel to the casing mounting flange 54. With the seal 10 thus mounted and being spun, as in a lathe, a cutting knife 164 is advanced radially along a line lying generally parallel to the axially outer front surface 94 of the radial casing flange, cutting to a predetermined depth.

Preferably, as shown in FIG. 5, the cut terminates just short of the radially innermost extent of the casing radial flange. Thereafter, with the seal still chucked in the holder or like fixture 162 and rotated, a second knife 166 with an inner cutting surface 172 is positioned and advanced generally parallel to the non-contact face 38 of the seal ring 14, with the knife being advanced until it intersects the cut made by the first knife 164. This cuts out a peripheral section 168 which, while in place, continues to provide support for the ring, but which is desired to be removed before the seal is placed in use.

As shown in FIG. 6, after the cuts are made which form the disposable peripheral section 168, two thin elastomeric bodies 64, 170 remain affixed respectively to the margin 46 of the ring 14 and to the casing flange 56. Consequently, the resulting product includes the previously described thin and flexible support ring 64 as well as a protective cover for the end face 94 of the flange 56.

While the thickness of the body 170 is not particularly important, and it could in fact be eliminated, the thickness of the flexible support ring 64 can be important, inasmuch as it can control the flexing characteristics of the outer margin 46 of the ring 14. The thickness of the material, and degree of cure or cross-linking are used to control the overall flexibility of the ring margin, within reasonable limits intended required by the designer.

Figure 7:
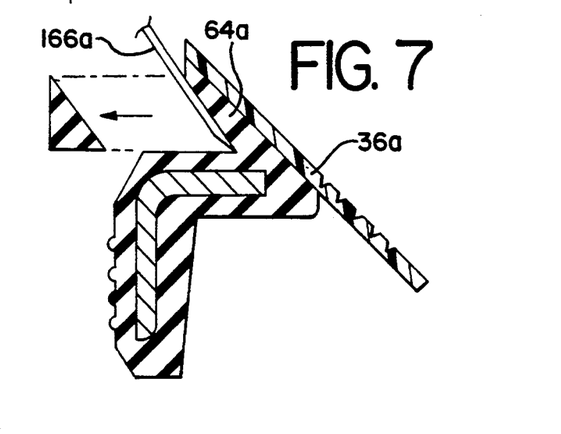
FIG. 7 is a view similar to that of FIGS. 5 and 6, but showing a modified cutting method used to create a modified product according to the invention.

Referring now to FIG. 7, a modified arrangement is shown. Here, a cut made by the knife 166a results in the formation of a tapered support ring 64a. As shown the support ring 64a tapers toward a thinner cross section as it approaches the outer edge of the seal ring 16a.

In this way, the stiffness in bending and the resilience of the outer margin of the seal ring can be controlled within its radial extent, as well as on an overall basis. Thus, if the web as a whole is comparatively thick, more resilience and a greater preload is provided; if the web is thin, the overall spring rate and stiffness are reduced. Using the tapered cut technique of FIG. 7, the outer margins may be made considerably more flexible than the inner margins, for example. A reverse angle cut can add uniformity to the deflection v. load characteristics of the seal.

In the foregoing illustrated drawings, a seal construction has been shown wherein the entire width of the seal ring was formed in a frustoconical configuration and wherein the ring thus formed was attached by bonding to a radial casing flange. In such seals, there was a radial overlap between the outer margin of the seal ring and the radial casing flange.

In keeping with the invention, its advantages can be realized with other arrangements wherein a portion of the seal ring is required to be spaced from the radial flange of a casing with which the seal ring is axially aligned. In such cases, the taper, bevel, or frustoconical shape of the ring provides a potential for axial flexing, whereas rubber in the axial overlap area between the seal ring margin and the casing flange prevents such flexing or renders it difficult. The formation of an undercut between this part of the seal ring and the casing is difficult to achieve in the molding process.

In the absence of such an undercut, i.e., where there is a solid annulus of rubber serving to bond the non-contact face of the seal ring to the casing flange, the seal ring is rendered inflexible and incapable of accommodating the necessary runout for movement in dynamic use. In the foregoing connection, it will be recalled that the mere fact that an elastomer is potentially flexible does not insure that a part supported by rubber will flex, inasmuch as rubber is substantially incompressible when confined. Hence, with the invention having the object of providing an unconfined or open annular volume area between parts intended to flex, provision must be made to achieve this feature in the finished product.

With the foregoing consideration in mind, reference will now be made to additional seal constructions in which various arrangements of the lubricous plastic materials, the casing, and the rubber bonding materials are arranged so as to permit seal rings that are flexible in an axial direction.

In view of the importance providing a flexible end face seal having a significant radial extent, the important advantages attainable through the use of the present construction and the method of making the inventive seal can be readily appreciated.

Figures 8, 9, 10:
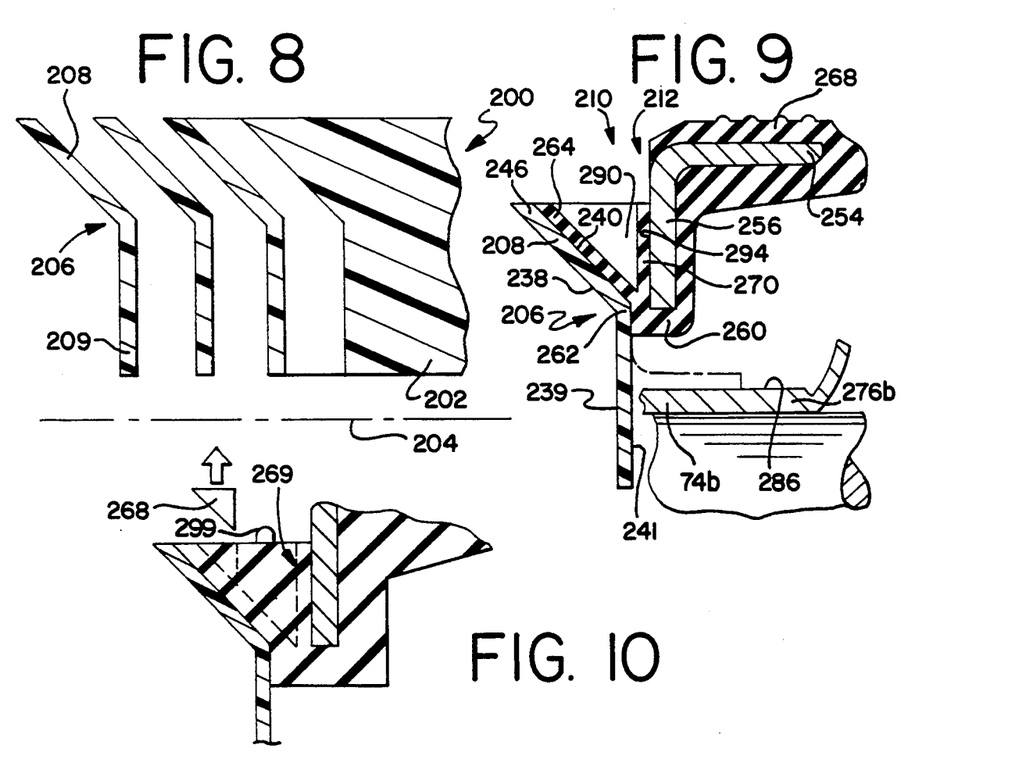
FIG. 8 is a fragmentary vertical sectional view showing a billet of fluorocarbon or like lubricous resin material and showing plural contoured annular, washer-like specimens being cut therefrom.
FIG. 9 is a fragmentary vertical sectional view of a seal incorporating the contoured washer elements of FIG. 8.
FIG. 10 is a fragmentary, enlarged view of a portion of the seal of FIG. 9, showing the seal as molded and prior to removal of a portion of a solid ring, molded in place and used to secure the washer to the casing.

Referring now to FIG. 8, there is shown a billet generally designated 200 of a resinous material such as a PTFE billet from which a modified form of lubricous seal ring is to be made. The billet 200 is of cylindrical shape and has an inner diameter 202 spaced from a center line which is shown for illustrative purposes at 204, it being understood that the center line would normally be spaced considerably apart from the inside diameter of the billet. Typically, in seal having a 3" to 4" diameter, the radial extent of any section of the seal might be about ⅛ to ¾ of an inch, i.e., the center opening might be 2.5 to 3 inches in diameter with the outside diameter of the washers formed from the billet being 4 inches.

In keeping with the invention, a plurality of substantially identical washers generally designated 206 are formed by making cuts in the billet. The resulting washer-like seal rings 206 have a frustoconical or tapered section 208 and a substantially radially extending section 209.

Referring to FIGS. 9 and 10, a seal generally designated 210 may be formed using such a washer as a sealing ring 206. The result seal includes a casing element generally designated 212 and shown to include an axial flange 254 and a radial flange 256. In the preferred form of seal, a charge of elastomer is used to form a seal in a manner analogous to the manner in which the seals of FIGS. 1–3 are formed.

In this instance, a so-called rubber OD seal having an outer cylindrical band 268 of rubber is provided and when the seal is completed, the outer portion 208 of the seal ring is supported or backed up by an elastomeric support ring 264. The seal ring 206 is retained in position by the elastomeric sealing collar 260 which is bonded to the center portion 262 of the seal ring 206.

As in the other embodiments, the ring 206 has an inclined contact surface 238, a radially extending contact surface 239 (in its as-formed condition) and counterpart, non-contact surfaces 240, 241. As shown in FIG. 9, while the ring outer margin 246 is inclined or frustoconical, the inner margin is capable of being deformed or "bellmouthed" into sealing contact with the surface 286 of an associated axial flange 276b forming a part of a seal wear sleeve 74b.

As shown in FIG. 10, two or more knife cuts, including a generally radial cut and an inclined cut, provide a pair of removable annular plug sections 268, 269 which can be removed from the seal, leaving a void or working clearance space 290 (FIG. 9) between the film of rubber 270 covering the end face 294 of the casing radial flange 256. FIG. 10 shows that, essentially, cutting and removal of the plug sections 268, 269 may be achieved in the same manner as is illustrated and described in connection with the illustrative examples of FIGS. 5–7.

The reason for forming the plug in two sections appears below.

Figure 11:
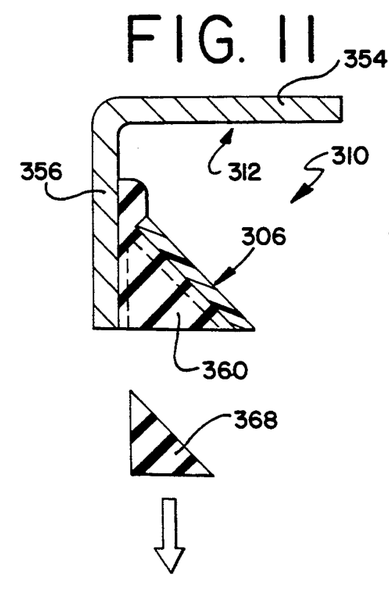
FIG. 11 is a fragmentary vertical sectional view, partly schematic in nature, showing the formation of a seal analogous to that of FIGS. 8-10, but differing therefrom in detail.

Referring now to FIG. 11, another embodiment of the invention is shown to be embodied in an excluder seal generally designated 310, wherein a casing generally designated 312 includes axial and radial flanges 354, 356 to which a lubricous seal ring 306 is secured by an annular body 360 of rubber. In the embodiment illustrated in solid lines in FIG. 11, the body 360 includes a solid annulus section of generally triangular cross-section and this in turn includes a separable plug section 368 which, when removed, creates a space 390 (FIG. 12) between the overlapped margin 364 of the seal ring 306 and the radial flange 356.

In reference to FIG. 11, it will be noted that virtually the entire width of the seal ring 306 is in an overlapped relation to the radial flange 356. Because the seal 310 is an excluder seal only, there is no wide free margin, either frustoconical or radial, as in the constructions of FIGS. 1–10.

The principles of the invention nevertheless apply, i.e., the ability to provide an openable mold and a large undercut is not capable of practical achievement and hence the need to form a post-molding cut is required. As shown, the seal embodied in FIG. 11 is usually used in connection with a unitized seal of the type shown in FIG. 2, for example, and acts as an excluder seal.

Figure 12:
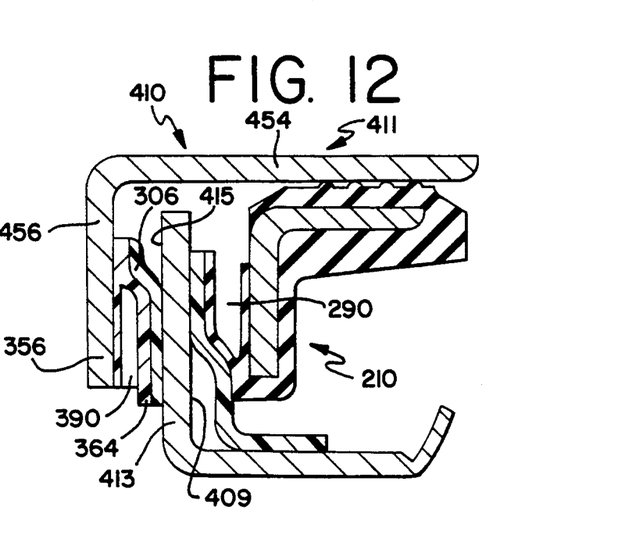
FIG. 12 is a vertical sectional view of a unitized seal incorporating the features of the seals of FIGS. 8-10, as well as those of FIG. 11.

In FIG. 12, a composite seal generally designated 410 is shown; this is a composite seal which includes an outermost casing generally designated 411 and shown to include an axial flange 454 and a radial flange 456, serving to position the lubricous excluder sealing ring 306. FIG. 12 also shows the excluder unit associated with seal assembly generally designated 210 and shown to be substantially identical to its counterpart in FIG. 9.

Thus, FIG. 12 shows the manner in which the seal of FIG. 9 is associated in use with the auxiliary excluder seal 312 of FIG. 11. The seal of FIG. 12 thus includes an intermediate seal or inner excluder seal acting on one axially directed face 409 of a wear sleeve casing radial flange 413; the ring 306 has a contact surface engaging the opposite or axially outwardly directed surface 415 of the casing radial flange 413.

Figure 13:
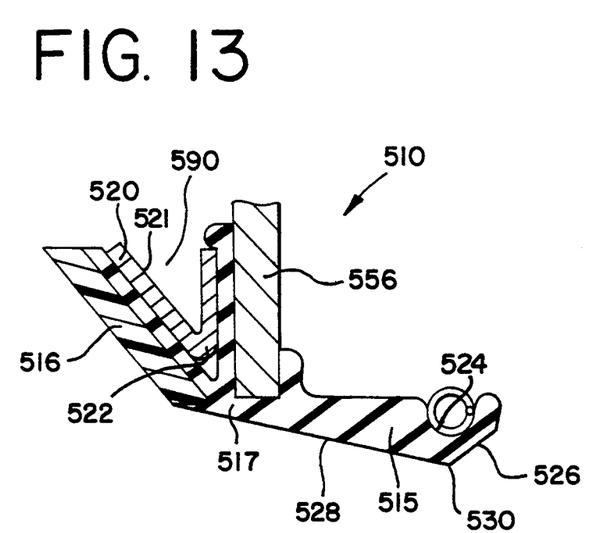
FIG. 13 is a fragmentary vertical sectional view of a further modified form of seal embodying inventive concepts.

Referring now to FIG. 13, a further modified form of seal generally designated 510 is shown to be made in keeping with the principles of the invention. Here, a casing radial flange 556 serves to locate an annular, relatively conventional lip seal body generally designated 515 and shown to be molded from an elastomer having a collar portion 517 serving to locate and a frustoconical auxiliary seal ring 516.

The seal of FIG. 13 is also shown to include an auxiliary spring biasing unit 520 of extending annularly about the groove 590 and being generally V-shaped cross section. Such auxiliary spring is ordinarily a so-called finger spring having multiple fingers 521 extending radially outwardly from a continuous center section 522. The groove or space 590 to accommodate this finger spring 520 is formed by cutting in the same manner in its earlier described counterpart.

The seal body 515 includes a conventional spring-receiving groove 524, oil and air side surfaces 526, 528 meeting along a generally circular locus 530 to create a seal band of intended contact with an associated shaft or wear sleeve in a conventional manner. FIG. 13 illustrates a seal construction wherein the primary sealing action is rubber-to-metal and the auxiliary or excluder action is between a resinous ring 516 and an end face surface (not shown), preferably made of a metal material.

Figure 14:
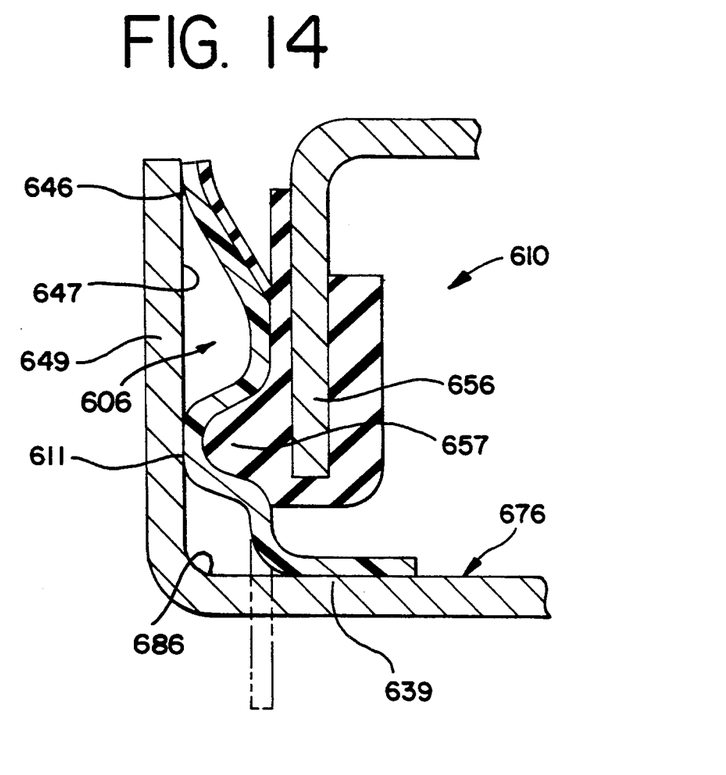
FIG. 14 is an enlarged vertical sectional view of a still further form of seal unit incorporating the principles of the invention, but differing in detail from the earlier shown embodiments.

FIG. 14 shows a still further variation of inventive oil seal assembly generally designated 610 and which is similar to the seal of FIG. 9 except that the lubricous fluorocarbon ring generally designated 606 is formed so as to provide an annular rib 611 extending axially away from the radial bonding or locating flange 656. In this embodiment, an annular rib support formation 657 of cured elastomer serves to retain the rib 611 in a position of registry relative to the other seal components.

The radially outermost mating portion of the seal ring has a contact surface 646 engaging an opposed counterpart surface 647 on the face of a wear sleeve radial flange 649 to provide an excluder seal. The rib 611 acts as a snubber to limit relative axial movement of the wear sleeve 676a and the seal assembly 610 during installation and use. As is shown, there is a radially inner margin of the seal ring 606 preformed or, in the alternative, deformed during installation so as to make primary sealing contact with the outer surface 686 of a wear sleeve axial flange 676.

From the foregoing examples described in connection with FIGS. 8-14, it will be noted that the principles of forming a seal with a lubricous ring bonded to a radial flange-containing stiffener or casing and then removing a significant portion of the ring locating body to create an undercut permitting axial flexibility of the ring contact margin can be achieved in a number of sealing configurations. The lubricous resin ring may have its flexibility or axial working range controlled by a snubber, by its own inherent resiliency, by the extent to which a rubber web or the like remains affixed to it to serve as a backing, or a combination of any two or more of such elements.

Referring to molding of products of the type shown in FIGS. 8-14, molds such as those Figures shown in FIGS. 3 and 4 may be used but suitably modified to accommodate the purely radial extent of the as-formed or as-cut shape of the inner seal ring margin. The portions of the mold that create the removable support annulus of triangular cross section are the same in all cases.

Referring now to FIG. 10, and in particular, to the creation and stage-wise removal of two annular back-up or ring margin support sections made of elastomer, one preferred manner in practicing the invention is to mold the product as shown in FIG. 10, and then make two radial cuts and one diagonal cut intersecting the inner edges of both radial cuts. This creates preformed annular sections of triangular and trapezoidal cross-section, respectively.

After such cuts have been made, the axially outermost, triangular cross-section piece 269a is removed, leaving a small V-groove extending circumferentially about the seal between the radial casing flange and the outer seal ring margin. Thereupon, the seal portion illustrated in FIG. 10 may be combined with a wear sleeve of the kind shown in FIG. 2. The degree of axial deflection of the outer seal ring margin is limited by the presence of the remaining trapezoidal section, which effectively acts as a snubber.

After the seals are assembled by deforming the casing flanges so that the degree of axial excursion is limited, or after the seal has been assembled and placed in use in the application, only then is the remaining support section of trapezoidal cross-section removed, permitting enhanced flexibility of the outer ring margin. The use of this step-wise approach permits advantage to be taken of the two-piece removable support section for initial locating purposes followed by removal to permit enhanced flexibility.

In FIG. 10, a small knob or like element 299 has been shown as a way to facilitate grasping for removal of the support ring after formation and cutting.

FIGS. 1-7 show seals wherein the inner margin includes an embossed hydrodynamic pattern, while such pattern is not shown in the other examples. It will be understood that such pattern is an optional (although often preferred) feature and such pattern may be imparted to the contact side of the seal ring, either as a part of the molding process or otherwise in a post-molding operation such as lathe cutting or embossing. Such formations may likewise be embossed or cut prior to insertion of the ring into the mold assembly.

It will thus be seen that the present invention provides an improved composite seal and methods of making the same, such seals and methods having a number of novel advantages and characteristics, including those referred to specifically herein and others which are inherent in the invention. Several preferred forms of seals and methods embodying the invention having been described in detail by way of example, it is anticipated that variations in the described forms of construction and methods may occur to those skilled in the art, and that such variations may be made without departing from the spirit of the invention or the scope of the appended claims.

We claim:

1. A method of manufacturing a composite oil seal having a seal casing with an axial casing flange, a radial casing flange with an inner margin and a primary seal element made from a thin, flexible seal ring made of lubricous fluorocarbon material of frustoconical cross-section, said seal ring having a central portion and a radially outer portion, and said seal ring being secured to said radial flange of said seal casing by a positioning collar of cured elastomer extending between a portion of said radial casing flange and a generally central portion of the non-contact side of said seal element, and wherein at least said radially outer portion of said seal ring is of frustoconical cross-section, said method comprising positioning said casing within a mold having various elements with surfaces defining portions of a mold cavity, including a mold surface adapted to receive and support a portion of said primary seal element, positioning a seal ring with at least its radially outer portion within said mold cavity with the central portion of its non-contact side in facing relation to said radial casing flange, and its outer margin spaced radially outwardly of said radially inner margin of said radial casing flange, closing said mold elements to define a cavity having said seal ring and a portion of said casing lying within said cavity, said cavity including a space for forming a solid annular support ring between said casing radial flange and said outer margin of said seal ring, filling said cavity with a fluent curable elastomer and permitting said elastomer to cure so as to bond said non-contact side of said casing flange to said seal ring, removing said composite seal from said mold and subsequently removing a substantial portion of said solid annular support ring so as to create a composite seal having said seal ring joined to said casing only by a cured elastomeric positioning collar of thin cross section.

2. A method as defined in claim 1 which further includes forming hydrodynamic elements at least on a contact side of the inner margin of said seal ring.

3. A method as defined in claim 1 wherein removing said substantial portion of said solid annular support ring comprises forming and removing an element which is generally V-shaped in cross section.

4. A method as defined in claim 1 wherein removing said portion of said solid annular support ring comprises moving a cutting knife substantially radially into said annular support ring, moving another knife into said support ring along an axis generally parallel and spaced axially inwardly from the non-contact surface of said seal ring until the cuts formed by said knives meet, and thereafter removing the ring formed by said knife cuts.

5. A method as defined in claim 1 wherein removing said portion of said solid annular support ring includes forming a generally radially extending cut in said support ring and additionally forming a second cut in said support ring, said second cut being formed along an axis that is slightly inclined with respect to the non-contact surface of said seal ring.

6. A method of manufacturing a composite fluid seal having a thin, primary seal ring of generally frustoconical cross-section, said ring having contact and non-contact faces and being made from a lubricous plastic material, said ring being secured to a rigid casing by an annular mounting collar of cured elastomer extending between and joining a portion of said casing to a portion of said non-contact face of said seal ring, said method comprising positioning a casing unit within a mold assembly having surfaces defining a cavity for receiving and positioning said casing and said seal ring and for forming the contours of said elastomeric portions of said composite seal, including a portion of the surfaces of said mounting collar, said method comprising opening said mold assembly, inserting a rigid casing unit within said mold assembly, inserting a lubricous plastic fluorocarbon seal ring of frustoconical cross-section into said cavity, said ring also having said contact and non-contact faces and an edge defining its outer diameter, and while maintaining said non-contact face in facing relation to a radially inner portion of said casing, closing said mold, filling said cavity with a charge of fluent, curable elastomer and permitting said elastomer to cure so as to form a solid annular support ring having a given outer diameter and extending between a portion of said casing and a portion of said non-contact seal ring face and to join said portions together, said given outer diameter of said support ring and said seal ring edge being substantially coextensive, opening said mold and removing said composite seal therefrom, and subsequently removing a substantial portion of said solid annular support ring so as to reduce its cross-section and leave said seal ring affixed to said casing by only a bonding collar of narrow cross-section.

7. A method as defined in claim 6 wherein said lubricous plastic material is a fluorocarbon material.

8. A method as defined in claim 6 wherein said lubricous plastic material is a material made from a polymer of tetrafluoroethylene and which further includes plural reinforcing fibers disposed therein.

* * * * *